(12) United States Patent
Kibria et al.

(10) Patent No.: US 6,791,473 B2
(45) Date of Patent: Sep. 14, 2004

(54) SMART PARKING METER SYSTEM

(75) Inventors: Sami Kibria, Winnipeg (CA); Joseph Chai-Wan Wu, Winnipeg (CA); Jose Alejandro Rueda, Winnipeg (CA); Nicholas Christopher Wade Thiessen, Winnipeg (CA); Christopher Troy Kavanagh, Winnipeg (CA); Paul Serge Card, Winnipeg (CA)

(73) Assignee: Telecommunications Research Laboratory, Edmonton (CA)

( * ) Notice: Subject to any disclaimer, the term of this patent is extended or adjusted under 35 U.S.C. 154(b) by 0 days.

(21) Appl. No.: 10/307,513

(22) Filed: Dec. 2, 2002

(65) Prior Publication Data

US 2003/0179107 A1 Sep. 25, 2003

Related U.S. Application Data

(60) Provisional application No. 60/334,075, filed on Nov. 30, 2001.

(51) Int. Cl.[7] ................................................. B60Q 1/48
(52) U.S. Cl. ........................... 340/932.2; 340/309.16; 340/539.13; 340/933; 340/988; 235/381; 235/384; 705/13; 705/418
(58) Field of Search ................................. 340/932.2, 904, 340/933, 988, 870.02, 309.16, 539.13; 235/382, 381, 384; 705/13, 418, 21

(56) References Cited

U.S. PATENT DOCUMENTS

| | | | | |
|---|---|---|---|---|
| 5,266,947 A | * | 11/1993 | Fujiwara et al. | 340/932.2 |
| 5,442,348 A | * | 8/1995 | Mushell | 340/932.2 |
| 5,563,491 A | * | 10/1996 | Tseng | 320/2 |
| 5,648,906 A | * | 7/1997 | Amirpanahi | 364/464.28 |
| 5,659,306 A | * | 8/1997 | Bahar | 340/932.2 |
| 6,344,806 B1 | * | 2/2002 | Katz | 340/932.2 |
| 6,380,851 B1 | * | 4/2002 | Gilbert et al. | 340/517 |
| 6,411,937 B1 | * | 6/2002 | Brusseaux | 705/21 |
| 6,519,329 B1 | * | 2/2003 | Hjelmvik | 705/13 |

* cited by examiner

*Primary Examiner*—Davetta W. Goins
(74) *Attorney, Agent, or Firm*—Adrian D. Battison; Michael R. Williams; Ryan W. Dupuis

(57) ABSTRACT

A Smart Parking Meter System makes it possible to track whether or not a vehicle occupies parking meter stalls and whether or not the time has expired. The system uses a wireless communication protocol which may be of the type known under the trade mark "Bluetooth" and provides the portability of embedded systems and the convenience of personal digital assistants with the powers of the C and Java programming languages. There are two main components to the Smart Parking Meter System, the handheld device, or the PDA, and the actual parking meters. Each device has the Smart Parking Meter System application installed in it, as well as the wireless modules, such as Bluetooth to use as a communication medium. The parking meters also have a motion sensor to detect any movement within it view range. The handheld device is able to extract all the parking states for each parking meter within a block or street depending on user configuration of system.

15 Claims, 6 Drawing Sheets

\* The status can be either OK, or RESEND
\*\* Connections may be legally dropped after any Meter_Sync_Done event, so the sender of the event must be prepared for such an occurance.

US 6,791,473 B2

SMART PARKING METER SYSTEM

This application claims priority under 35 U.S.C.119 from Provisional Application Serial No. 60/334,075 filed Nov. 30, 2001.

This invention relates to a parking meter system which allows rapid communication between parking meter elements at the parking locations and a transportable unit operable by an attendant.

BACKGROUND OF THE INVENTION

Originally networks were designed for the communication of one computer to a group of other computers, where they all could share data—this was typically done via a wire such as a coaxial cable. One of the set-backs to all these networks were they were fixed in place and required set up, such as infrastructure. Today, we not only use wires but we are also migrating to a new form of data transfer—wireless. The basic fundamental concept of wireless communication is how the frequency spectrum works. The range of frequencies supported by some wireless protocol is referred to as the bandwidth of that protocol; and the transmission rate is proportional to bandwidth.

One available communications protocol is that provided by Ericsson under the trademark "Bluetooth" which is an open wireless specification of communicating on the 2.4 GHz ISM band. Many wireless applications work on a precise frequency, such as Bluetooth.

Bluetooth utilizes the 2.4 GHz ISM band for wireless communication. This means that we are essentially going to have networks that act like "plug and play" hardware for computers. There is not much set up required, just simple authentication on to the system and we can use it, without much configuration or problems.

For our application, we used the Bluetooth wireless standard (our communication protocol is independent of the wireless medium) when this network is installed, it allows simple, embedded micro-controllers to communicate to each other and pass a specific data set to other embedded micro-controllers via a wireless communication link.

Depending on where you go and what system is being implemented in those areas the wireless revolution is growing at an exponential rate, beginning with AMPS (advanced mobile phone service), to wireless LANs based on the IEEE standard or 802.11, personal area networks such as the Bluetooth technology, and wide area networks beginning with AMPS and now including GSM (global system for mobile communications) and CDMA (code division multiple access, which includes second to third generation technologies).

With the advent of wireless networks we are now wanting continuous connection, from our personal area networks, local area networks to our wide area networks. This translates into fixed networks, to wireless networks, to ad-hoc wireless network.

All devices using the Bluetooth open standard will be interoperable. When 802.15 is finalized then we will be guaranteed of the interoperability of all Bluetooth devices.

The 802.15 is the IEEE standard for Personal Area Networks, and more specifically wireless short distance ad-hoc networks. There are 4 main task groups in the 802.15 standard:

| | |
|---|---|
| Task Group 1-wireless personal area networks | This task group is based on the Bluetooth version 1.1 standard. |
| Task Group 2-coexistence | This task group deals with the interaction and coexistence of 802.15 and 802.11 (wireless local area networks). |
| Task Group 3-high data rate | This task group deals with high speed data rates for wireless personal area networks. |
| Task Group 4-low data rate | This task group deals with low speed data Rates that is required with long term battery solutions. |

With the creation of this new IEEE 802.15 based on the Bluetooth standard, it will become a long lasting standard to be implemented in wireless ad-hoc networking.

The standard for the token ring protocol is Institute of Electrical and Electronics Engineers (IEEE) 802.5.

Performance Improvement Studies in Bluetooth Piconet Formation: Using Knowledge at the Master. S. Balasubramanian, S. P. D. William, A. Swaminathan, A. Siromoney, and M. Rajam. HiPC 2002.

Developing with Qt makes the process of keeping the PDA environment pleasing for a great number of local schemes. For example a 24 hour clock might be more pleasing for some eastern country. Or another country might be more accustomed to another language besides the default for the PDA. For brevity we will refer you to the Qt documentation that in online or that comes with the toolkit download. This seamless feature allows one to code relatively exactly the same and have the Qt framework handle all the details. This will make the introductions to a foreign country much easier. It should be noted that the objects and concepts implemented with QT is not specific to QT, it may be also implemented on Windows, or any type of system that allows for object collaboration.

SUMMARY OF THE INVENTION

Currently a city police or a parking ticket officer or attendant is required to walk along the street to inspect each parking meter to see if there is parking violation. Under this Smart Parking Meter System, the officer needs to just carry a handheld device and drive in a car or walk along a street, to patrol streets with parking meters. The device will automatically beep with a red light when it passes by a violated parking stall. Not only with expired parking meters, this can also apply to free limited time parking, say 2-hours free parking. Officers no longer need to mark the tires anymore nor go outside for long hours under harsh weather conditions.

According to the invention there is provided a apparatus for use in controlling parking comprising:

a plurality of parking meter elements each for mounting on a support adjacent a parking location, each parking meter element including:

a payment receptacle operable by a person parking a vehicle for receiving a payment from the person;

a display for displaying an allowable time of parking;

a sensor for detecting the presence of a vehicle in the associated parking location;

a control module responsive to the payment receptacle and the sensor and arranged to control the display;

at least one transportable communication unit for transportation by and manual operation by an attendant including a control module for communicating with the parking meter elements;

the control modules of each of the parking meter elements and the communication unit including communications protocols by which the parking meter element and the communications unit communicate to each other via a wireless medium.

The Smart Parking Meter System is an ad-hoc wireless networking communication protocol. The Smart Parking Meter System communication protocol is implemented within a handheld device and a parking meter, where both devices communicate to each other via a wireless medium. The Smart Parking Meter System protocol can be employed in either a point-to-point wireless system or a multi point wireless system.

This network is job specific, meaning that its network protocol and communication protocol will only be used and accessible to the other systems that use these specific protocols; in this case the Smart Parking Meter clients (or nodes) and servers (or master nodes) will have access to this network only.

There are two hardware components to the Smart Parking Meter System, the handheld device, and the parking meter. The handheld device will require a wireless module either embedded in the system or something which may be connected to the device, such as a PCMCIA (Personal Card Memory Card International Association) card sleeve. The parking meter will require the Smart Parking Meter Application to be installed in each parking meter. The parking meter will require power to be supplied to each meter. The power will be used by the motion sensor for the parking meter to detect an object in its view range (that is, a vehicle or some object in the parking stall), and some embedded device, that will have a wireless module for wireless communication to other parking meters with this system, wireless communication with the handheld device, and the Smart Parking Meter System application.

The embedded system will be required to:

Sense if the meter is in the paid or unpaid state.

Sense if the parking stall is occupied or not.

For limited time parking meters, the device needs to have a motion sensor and will be required to maintain the amount of time the object has been in its view.

A programmable setting is required to define the period of free parking.

It has to have a wireless communication module or an embedded chip to communicate with a remote master device or a remote slave device as well as a handheld device.

1. The handheld device will act as a master for the system meaning that the handheld device will initiate contact with the parking meters.

2. The parking meters will act as masters and slaves within there own network, where a handheld device will always act as a master.

Optionally, it has a programmable timer to set the hours of operation for each parking meter, that is, if there is a meter in a two hour zone.

Three components to the communication protocol for the parking meters:

1. Dynamic Parking Meter Table

Each meter will contain a table of entries, where each entry is the status of a meter on its block. Each meter will have its own block id so meters on another block will not communicate to other meters not on there block.

The size of the parking meter status table is a dynamically created table. As more parking meters are discovered or removed on the block with the same block id, the status table of each meter is passed to each other meter, the status table may increase and decrease in size.

The messaging system deployed within the parking meters is designed to be event driven. In other words, once the state of a given parking meter changes it will notify its neighbors of this change. The neighbors will then propagate this change in state to their neighbors; the message will be dropped once there are no more parking meter devices to be contacted by a given parking meter.

Currently most parking meters have a maximum of 2 hours of parking when paid for. To implement this amount to time we could use a 8 bit representation or one byte. Where the first bit can be one of two states, 0 meaning no object occupying the parking space, or 1, meaning that an object occupying the parking space (or we could use 0 to mean an object is there, and 1 to mean an object is not there). The next 7 bits can represent 127 minutes. If we had a parking meter that had greater than 2 hours than we could use a 2 byte representation when the first bit could indicate whether or not the parking space is occupied or not, then the next 15 bits could represent 32767 minutes. This implementation could be different dependent on what the user would like, how much time the user would like to keep track of, as well as how precise we would like to keep of the time.

2. Connection Priority Thread

This priority thread is used for incoming connection events by other devices (that is from other parking meters and handheld devices). There are two types of incoming priority connection events, the connection event of parking meters is lower than that of the handheld device. Therefore when a handheld device makes a connection to any parking meter, that connection becomes the highest priority event.

3. Internal Task Queue Priority Thread

The internal task queue priority thread was developed to handle multiple race condition situations. An example of this is when a multiple devices are trying to connect to the same device. Since communication with the hardware is not an atomic function. Other devices could establish connections with us when we thought we could create the connection. To handle this type of condition we implemented a lock abstraction. Basically, the task priority threads job is to open a connection to the next device in the current tasks list.

The internal task queue never actually hangs onto a connection lock, the connection lock is only held by the External Connection Priority Thread so the all other internal priority threads know the hardware is busy.

There are two crucial words, in point (2) and point (3), priority and thread. We have implemented two separate applications employing a priority-based system, as well as a thread-based application. The priority-based application puts the task queue priority thread as the highest priority and the connection priority thread as the lowest priority. The thread-based application does not require a priority based system because each individual specialized event will be handled by a separate thread.

There are eight main object abstractions utilized within the handheld device application. These abstractions help co-ordinate application specific tasks as well as wireless communication to the parking meters.

1. City Meters and City Blocks

These object abstractions are designed to logically separate the entire meter network into groups of meters separated into blocks. These two objects need to provide an efficient mechanism for the searching of parking meter nodes and particular blocks.

2. Parking Meters

An abstraction representing a physical meter in the city. This is one object will emit a signal/message to other objects when the state is updated. Any object that wishes to "listen" for the signal/message can catch this signal and perform the appropriate action.

3. Meter State

This abstraction is a representation of some parking meters current state. Each parking meters state object is associated with a specific parking meter node.

4. Query Broker

The function of this broker is to managing the queries from other objects within the system.

5. Block Query

This object represents a separate thread of control, or another priority thread. Its responsibilities are to perform a query on a given block inputted by some user. This object handles all the necessary details in discovering and managing all incoming block information. It is also the aggregate for the State Manager object described below.

6. Result Queue

A priority queue based on the block id. Removal and addition of Items is based on the block id. This object needs to be priority and/or threading safe because this object acts as a producer and consumer of information.

7. State Manager

This object is responsible for marinating the state of each meter downloaded and viewed; this includes offering estimations of whether or not a parking meter node should be updated. This involves examining time stamps from the meter state object.

8. Method of Communication—Worker Priority Thread

An object that wraps the lower level libraries used to communicate to the wireless hardware module in each device.

This object centralizes the devices interaction with the hardware to allow easy hardware error recovery and easy integration of new protocols and schemes for information retrieval.

Smart Parking Meter System—Message Passing System/Protocol

The messaging protocol is a brute force algorithm which attempts to counter the problem of creating connections to other devices by using random lengthened delays and multiple connection attempts to eventually to create a connection to other wireless enabled parking meters.

Creating the connection is probably the biggest bottleneck in a large point-to-point or multi point network. The best way to counter this is to use event driven communication so that devices are only attempting to open connections at appropriate times in order to reduce or eliminate paging collisions. Using a system similar to the Token ring protocol, the network is in a constant listening state, and a single master (or possibly two masters at opposite ends of the network) controls the entire network. The master has a list of every parking meter on the current block. It has information about which parking meters can be contacted by other parking meters, although it is not guaranteed to know every communication edge, but it will know enough of them to make a connected system back to itself. If the meters were not configured in a loop then it is able to detect that and take appropriate action.

In a circular configured system all Smart Parking Meter devices are in a listening state. The master of the block (which could be selected by choosing the lowest hardware device address, called the medium access control or MAC layer address) has a routing information list and passes this ordered list to the next address along with the states of all the meters. The meter then looks up the address of the meter after its own entry in the list and pass the list on to it adding its new state to the list. Also to increase the accuracy of the states held in the parking meters, the block master could send out multiple synchronize tokens Considerations for this system are the configuration stage and meter failure. The configuration stage has to be very robust to allow for high amounts of meter paging and inquiry collisions. As well meter failure could severely cripple the network. If the master disabled, the network would sit idly waiting for instructions from the master not knowing of the master's untimely demise. These are all special cases though that could be handled in multiple ways. Networks could time-out after a prolonged period of silence and attempt to reconfigure the network and select a new master.

Another consideration for timing accuracy is the use of Hops in the message token. Once a Smart Parking Meter has received the message token, it goes through the list and increment the hop counts of the other meters in the list, and add/update its own state supplying a hop count of 0. We could use an arbitrary number such as 2 seconds/hop, so when the handheld device receives a synchronize event it adjusts the times remaining on the meters by 2 seconds/hop.

SPECIFIC SMART PARKING METER PROTCOL HEADER IMPLEMENTATION

Message/Packet Formats

PDA to Meter Message Formats

These messages are used only when the remote master device is communicating with a parking meter. The remote master always initiates them, never by a parking meter.

PDA_SYNC

| Command | ID | Command Parameters |
| --- | --- | --- |
| PDA_SYNC | 0x01 | |

Description

The PDA_SYNC command is issued only by the remote master device (the iPaq) to a parking meter within range. It currently has no command parameters.

Command Parameters

None

PDA_SYNC_RESULT

| Command | ID | Command Parameters |
| --- | --- | --- |
| PDA_SYNC_RESULT | 0x02 | Num_Meters, ADDR[i], State[i]. . . ADDR[N], State[N] |

Description

The PDA_SYNC_RESULT is sent from the parking meter to the remote master device that initiated the PDA_SYNC. It can contain up to 255 meters and their states.

Command Parameters

| | |
|---|---|
| Num_Meters | 1 Byte |

| Value | Parameter Description |
|---|---|
| 0x00-0xFF | Specifies the number of parking meters that are returned in this packet. |

| | |
|---|---|
| ADDR | 6 Bytes |

| Value | Parameter Description |
|---|---|
| 0xXXXXXX | The Bluetooth device address of a parking meter |

| | |
|---|---|
| State | 1 Byte |

| Bit Format | Parameter Description |
|---|---|
| 0xxxxxxx | The first bit is the occupied flag. 1 = occupied, 0 = unoccupied |
| Bit Format | Parameter Description |
| x0000000 | The last 7 bits specify the time remaining on the meter. The value is unsigned and anything higher than 127 minutes becomes 127 minutes. |

PDA_SYNC_RESULT_ACK

| Command | ID | Command Parameters |
|---|---|---|
| PDA_SYNC_RESULT_ACK | 0x05 | Status |

Description

The PDA_SYNC_RESULT_ACK is sent from the remote master device after a result has been received to signal to the parking meter what its next action should be.

Command Parameters

| | |
|---|---|
| Status | 1 Byte |

| Value | Parameter Description |
|---|---|
| 0x00 | Status OK: Signals that the result was received OK, ready to receive next event |
| 0x03 | Status RESEND: Signals that there was a problem with the results packet and it should be resent |

PDA_SYNC_COMPLETE

| Command | ID | Command Parameters |
|---|---|---|
| PDA_SYNC_COMPLETE | 0x03 | |

Description

The PDA_SYNC_COMPLETE command is sent from the parking meter to the remote master device to signal that all meter states have been sent. After this the remote master device should close the connection.

Command Parameters

None

Meter to Meter Message Formats

These messages are used by the parking meters to communicate with each other and synchronize the meter states amongst themselves.

METER_SYNC

| Command | ID | Command Parameters |
|---|---|---|
| METER_SYNC | 0x07 | ADDR, State |

Description

The METER_SYNC command is sent from the current master parking meter to its slave. It contains the state and address of one parking meter.

Command Parameters

| | |
|---|---|
| ADDR | 6 Bytes |

| Value | Parameter Description |
|---|---|
| Value | Parameter Description |
| 0xXXXXXX | The Bluetooth device address of a parking meter |

| | |
|---|---|
| State | 1 Byte |

| Bit Format | Parameter Description |
|---|---|
| 0xxxxxxx | The first bit is the occupied flag. 1 = occupied, 0 = unoccupied |
| x0000000 | The last 7 bits specify the time remaining on the meter. The value is unsigned and anything higher than 127 minutes becomes 127 minutes. |

METER_SYNC_ACK

| Command | ID | Command Parameters |
|---|---|---|
| METER_SYNC_ACK | 0x08 | Status |

Description

The METER_SYNC_ACK command is sent from the current slave parking meter to its master after a METER_SYNC event. It tells the master if we are ready to receive the next state, or if the current state has to be resent.

Command Parameters

| | |
|---|---|
| Status | 1 Byte |

| Value | Parameter Description |
|---|---|
| 0x00 | Status OK: Signals that the result was received OK, ready to |
| Value | Parameter Description |
| 0x03 | Status RESEND: Signals that there was a problem with the results packet and it should be resent |

METER_SYNC_DONE

| Command | ID | Command Parameters |
|---|---|---|
| METER_SYNC_DONE | 0x09 | |

Description

The METER_SYNC_DONE command is sent from the current master meter to the slave to tell the slave that there are no more states to be sent. This allows the two meters to switch roles and now the slave has the opportunity to sent its states to the master. If the meter receiving the METER_SYNC_DONE command has no states to send it closes the connection.

Command Parameters
None

The preferred communications protocol of Bluetooth open specification has 4 parts to it, the HCI (host controller interface), the L2CAP (logical link control and adaptation protocol), SDP (service discovery protocol), and RFCOMM (serial emulation over the L2CAP layer). The present system will support only the HCI, and L2CAP layer protocols to ensure interoperability between different operating system environments, and different Bluetooth devices.

The state of the Bluetooth hardware at the time of this patent was wireless support for only point-to-point Bluetooth hardware chips. The present system is a multipoint ad-hoc network service implemented in software with Bluetooth hardware and embedded systems doing the data processing and I/O control.

As stated previously, there are two separate application platforms for the present system; one is the actual meters themselves, the second is the PDA (personal digital assistant). Both platforms perform specific tasks in the application. The meters are the parking meters that will maintain the state of an individual in violation or not in violation of the meter expiry time. The PDA will be used to upload the state information of the meters on some block given by some map file.

---

Simple Use Case of present system with Simple Algorithm Implementation

---

Officer either walks or drives up to a parking meter equipped with the BlueMeter application and system
Officer initiates the synchronize event with any parking meter
    Inquiry is performed by PDA (personal digital assistant)
    First meter on its list is contacted
The parking meter receives a connection event, and checks the event
    If the command is a PDA synchronize command than it accepts it
    Else it rejects the command
The parking meter marks the origin address for returning data
The parking meter performs an inquiry to find surrounding meters
The parking meter removes the origin device from inquiry
    If the inquiry list is empty than we are at a leaf node and we return our paid state
    Else, we contact every meter on our list
The parking meter waits for response from all its children
The parking meter combines the results from its children along with its own and passes the data to its parent

---

As the synchronize message is passed from meter to meter building a master list so the path back to the PDA is known. This method ensures that all reachable meters are contacted, and that the synchronize message is never repeated. It also allows for quickly passing the paid state list back to the PDA.

BRIEF DESCRIPTION OF THE FIGURES

One embodiment of the invention will now be described in conjunction with the accompanying drawings in which.

DETAILED DESCRIPTION

Figure 1:
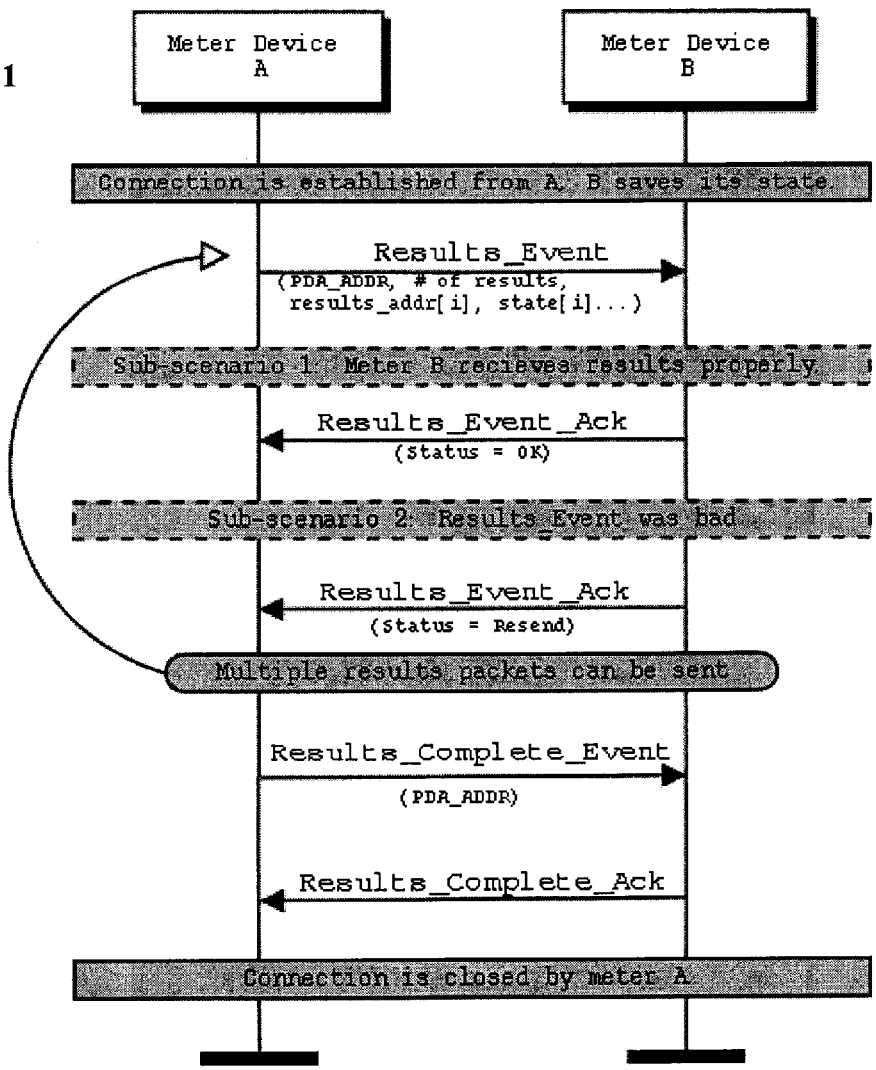
FIG. 1 is schematic illustration of the Message System. This schematic shows the messaging system for the present system at work.
Figure 2:
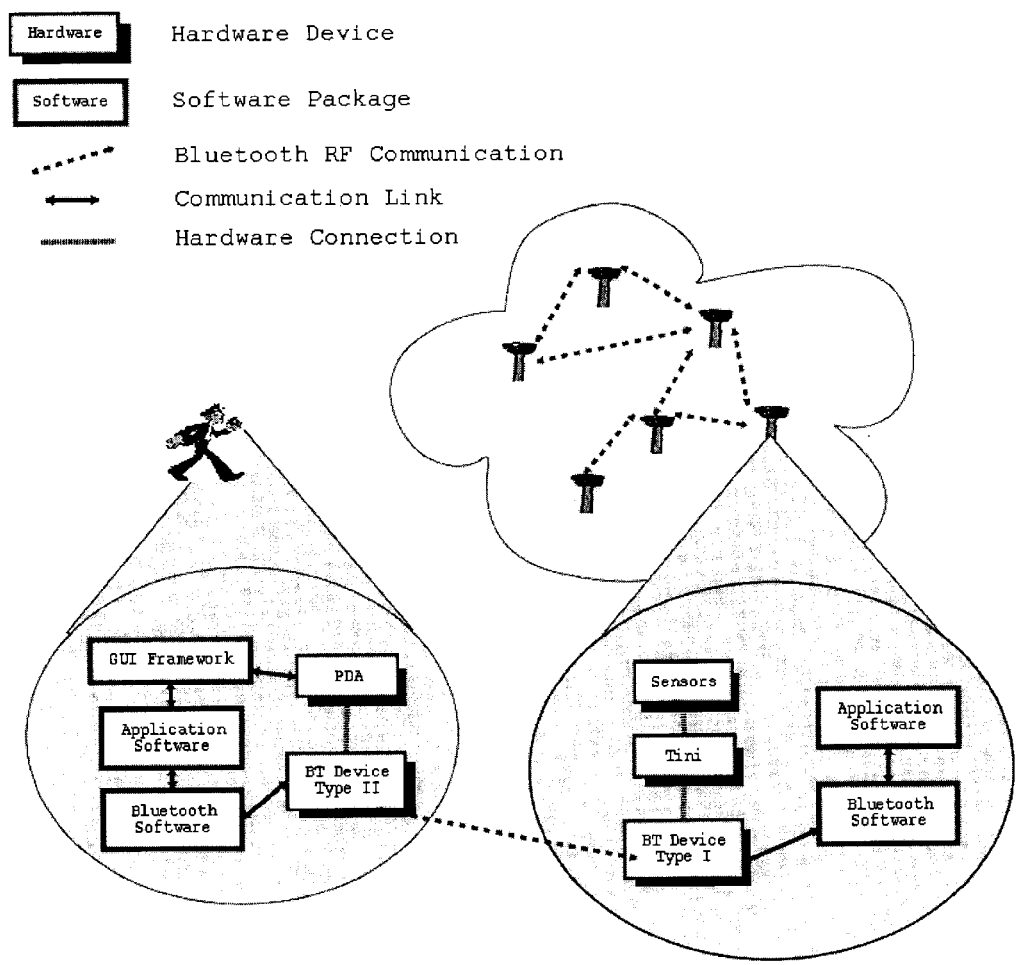
FIG. 2 is a schematic illustration of the Communication Diagram. This schematic shows how the PDA and PDA and vise versa communicate with each other.
Figure 3:
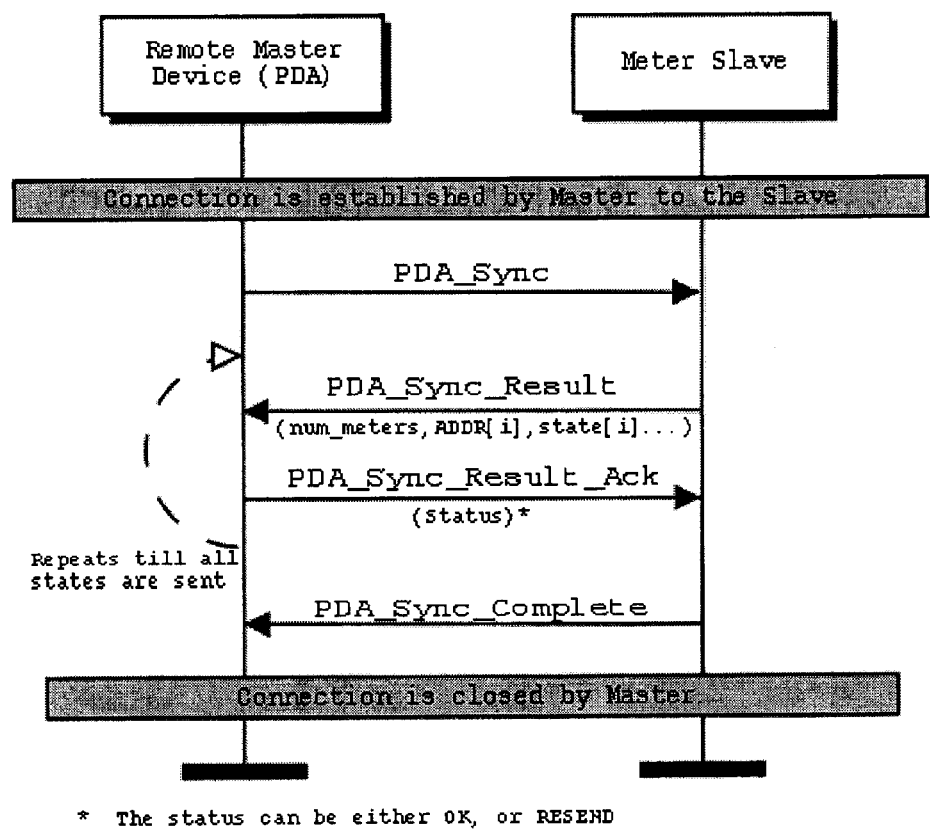
FIG. 3 is a schematic illustration of the Communication Diagram. This schematic shows how each device talks to other devices.
Figure 4:
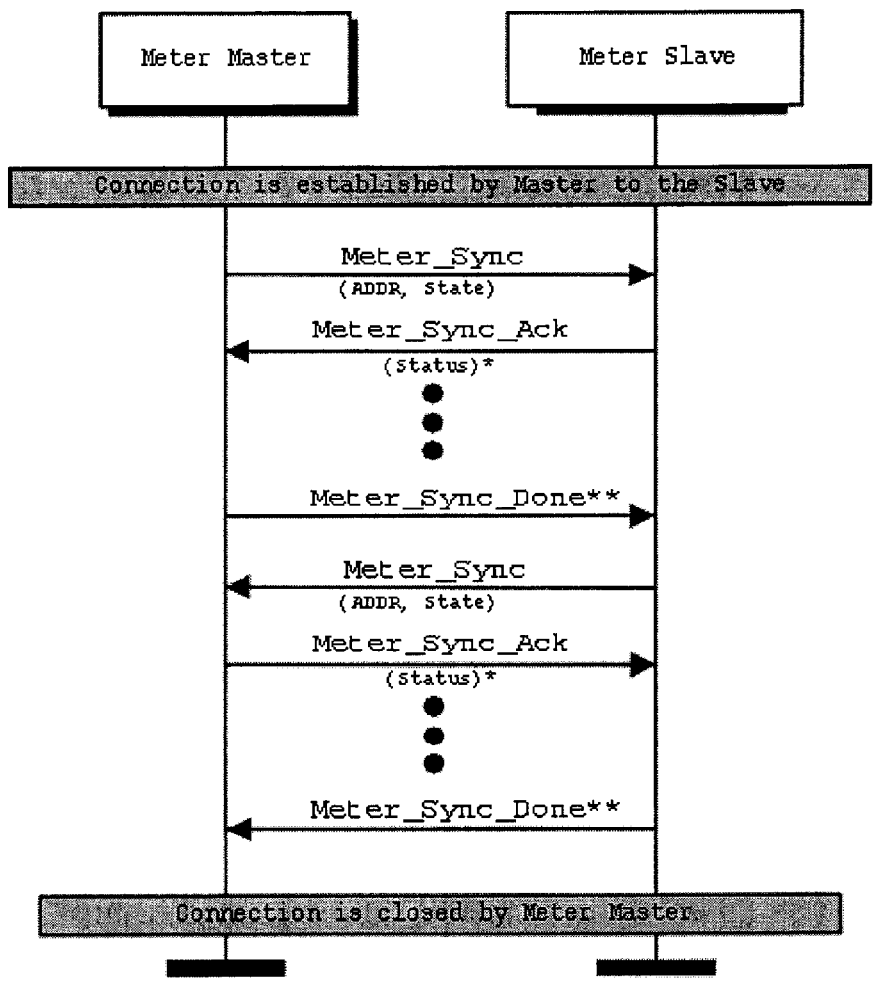
FIG. 4 is a schematic illustration of the device to device Result Events Diagram.
Figure 5:
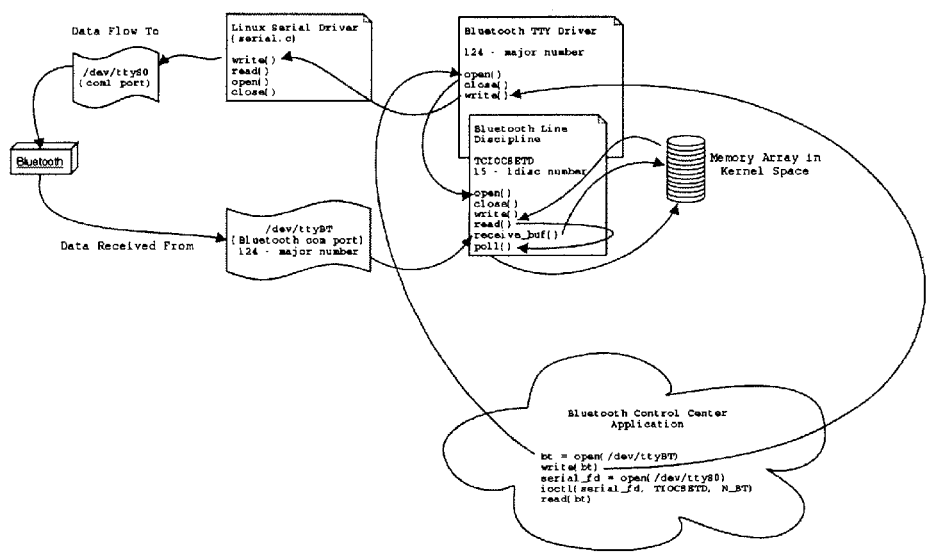
FIG. 5 is a schematic illustration of the Kernel Driver for Bluetooth Hardware. This schematic shows how data is moved from the serial up to the user.
Figure 6:
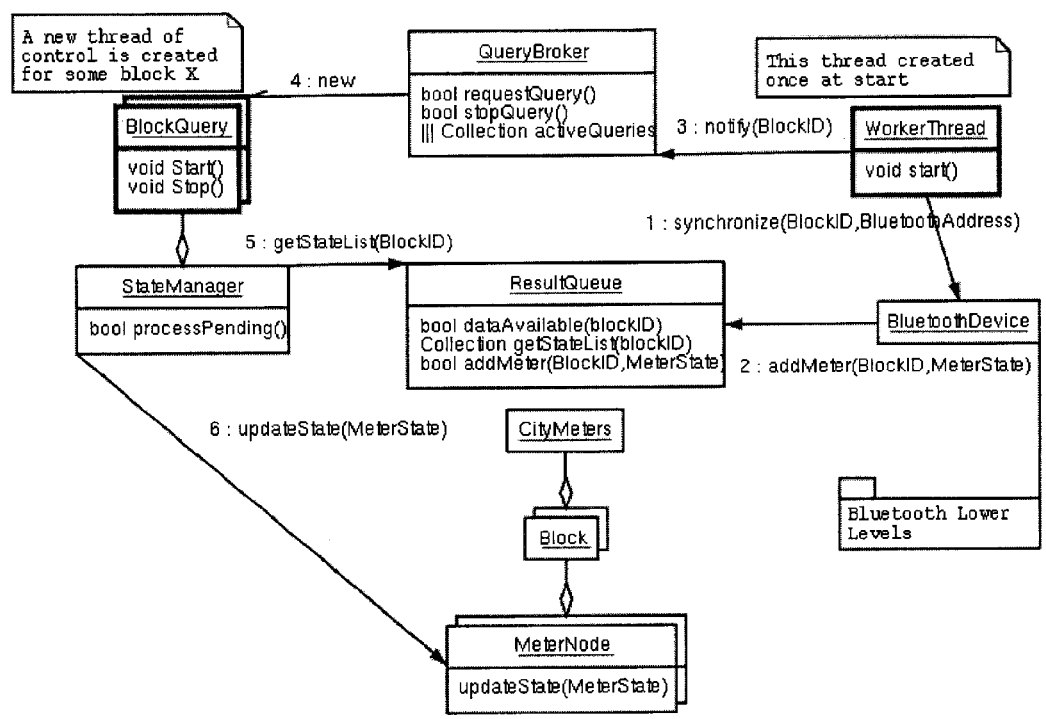
FIG. 6 is a schematic illustration of the Object Collaboration Diagram. This schematic shows how the software objects, that is the application objects, communicate with each other.

The present system is composed of two platforms, the parking meter and the PDA (personal digital assistant). The parking meter must maintain a status table of all the meter states on some block in order for this application to run with point to point Bluetooth hardware chips; this is called the Meter Status Table Algorithm. The PDA application framework is not only the GUI (graphical user interface) but also handles a set of object abstractions that collaborate between each. These abstractions are:

City meters and block

Meter nodes

Meter states

Query Broker

Block Query

Result Queue

State Manager

Bluetooth Device.

It should also being noted that the parking meter may or may not have multiple threads running within its primary application. Depending on what type of processor you will be utilizing, that is, one that handles actual threading issues (processor having a MMU or memory management unit), or one that may only have one process running and does not have threading capabilities (processor not having a MMU or memory management unit), we shall be equating each thread to a priority and referring to it as a priority thread. If you implement the present system on an embedded device that does not have threading capabilities then you must implement locks such as semaphores to handle the threading or priority issues.

---

Algorithm Consideration - using Bluetooth performance

---

There may be a speed consideration in establishing the network. An inquiry can talk around 4 seconds, and establishing connections and sending data may take on average (taking into account having to retry) 6 seconds there and back. So at a conservative estimate of 10 seconds per meter, a block of 50 meters could take at the worst 9 minutes. This is not likely to happen though, and these numbers are very conservative. Given that this solution provides a parallel approach, this really means that going 50 parking meters deep in one branch could take 9 minutes. Most of the time you would probably have at least 2 branches going around the block in opposite directions, cutting the time in half.
To reduce the synchronize time a caching scheme could be used at each meter to store the addresses of the reachable meters. The system above would be easily configured to handle that. This would shave off at least 4 seconds from each meter. Another command type would be needed to allow the meters to configure themselves in the event that their list was lost, or a new meter was installed
Thus the time needed by this solution needs to be controlled. To limit range of the synchronize event a few different methods could be used. Probably the best would be to use a Time To Live (TTL) component on each message. This is largely used by other networking protocols. The value is initially set by the PDA and decremented at each meter. So for a quick response a smaller TTL value of say 4 could be used. This will return all meters within 4

-continued

Algorithm Consideration - using Bluetooth performance hops. Larger values will take longer but will cover more meters. (See Table 1)
This solution is currently implementable in the hardware that we have. Memory requirements will have to be considered, but limiting the network size to a block should take care of that. Small changes may need to take place underneath, but the overlying idea remains the same.

Meter Inquiry—Using Bluetooth Implementation

To be able to find other parking meters in the area, the application utilized the Bluetooth Inquiry function, which scans for all as well as additional Bluetooth devices with in its range. Yet an issue that needs to be addressed is the amount of time devoted to finding other devices. When two Bluetooth devices are performing inquiries or connections then they appear to be invisible to all other Bluetooth devices. This means that in order for these devices to find each other they need to run inquiries at different times so they can find each other. Currently the devices will run an inquiry when they are idle, and given time they will eventually find each other properly. Once a Bluetooth device is found, it does not need to be found again before creating a connection.

Object Collaboration

In Appendix 4, a sequence of messages among the objects will be described using the above objects. This sequence represents the GUI (graphical user interface) requesting that a query be performed, that is, a GUI object simply asks the QueryBroker object to start a query. If the request returns true then that is all that is needed from the GUI. The GUI will be later notified by signals from these objects. Depicted in Appendix 4 is the Bluetooth Device invoking the addMeter member on a Results object. Typically, within the synchronize member, the addMeter is repeatedly called until there is no more data in the stream of meter states supplied by the lower level Bluetooth libraries.

The Worker Priority Thread Abstraction

The worker priority thread (currently implemented via pthreads in C or C++) is the only thread that interacts with the Bluetooth device. We felt it was a good idea to centralize the devices interaction with the hardware to allow easy hardware error recovery and easy integration of new protocols and schemes for state retrieval. This makes the implementation very customizable. The concept of the worker priority thread is as follows:

The meter is continuously searching for a valid Bluetooth device (being a meter in the city block network).
When a meter is found, if it is worth contacting we attempt to pull the entire blocks state from the meter.
When the state is retrieved from the meter, we add the results to a queue and notify a global object so that a new thread can be created to manage that newly retrieved state Currently the worker priority thread has been optimized to perform best under point-to-point communication via Bluetooth hardware and the current protocols being used. We reached these optimizations through testing and estimating on the communication interference (This is not RF, radio frequency, interference, but actual multi point limitations of the current Bluetooth hardware).

In addition to system specific details other optimizations are also considered, for example if we find a meter shortly after we've opened a connection and pulled the state we don't bother finding the meter again, this will reduce the traffic flow on the frequency itself. Subsequently if the hardware dies, then a timeout for connection creation is added to ensure that we do not continually try to connect to a dead device.

As a prelude to the following section, in a production environment the worker priority thread protocol could be modified easily to allow explicit querying and customization from the user. One method might be to include a thread safe Task Queue. The worker thread in addition to its normal tasks could perform user created task when it is ready. For example a user might turn off the constant flow of data and explicitly request a block query; at which time the application enters that task in the queue, the task then becomes visible to the worker thread and could perform that task.

Database Operations—Static Information Content

Each PDA (and likely an officer) would be responsible for some subsection of the city, the static data available for the PDA could reach fairly large quantities. Depending on the desired information that is needed for each meter and/or block memory requirements might also rise quickly. For example data that might be considered for a production environment could be statistics on each meter that the PDA might have to maintain and bring back to a central server for uploading. Also blocks could have (string) descriptions that make identifying the block easier—say the street corner for that block.

So far these limitations do not seem to pose a problem, however given a long list of meters searching through a simple linear list might become a bottleneck. Also maintaining the list in main memory might also pose problems. There are several reasonable options:

Limit the meters to an appropriate number per PDA
Explore relational database implementations for embedded systems
    IBM has a database targeted from embedded systems
    With a database management system, queries and searches for the would be optimized and how much data to be kept in main memory would a design decision
Develop a BlueMeter application specific database design scheme
Improve search techniques
Store all information in a RAMFS (read access memory file system) thereby increasing the search and store speed Officer Abstraction The idea of this abstraction is to use the locality of all the Bluetooth devices inside the meters (recall that the PDA knows exactly were each meter is located) and make a guess as to where the officer is standing. The guess will be within 10 meters of the actual location—and in most cases allot more accurate. We can get the link strength of the connected device and based on that strength we can determine the closest device we are connected to.

This is possible by "limiting" the PDA's wireless device to a range of 10 m. This coupled with static information about each block will allow the officer to pinpoint where he or she is standing. This offers an obvious advantage for the user. This could be implemented by recording and notifying the GUI as to what meter is "most" visible i.e. what the device returns in the worker thread when it looks for the closest meter.

A proposed system, called the Landmark Relative Positioning System, also called the LRPS, offers similar services that are available in the already widely used GPS (Global Positioning System). Note however, that this system is not intended to challenge GPS as a service, but to offer an alternative by taking advantage of existing landmarks. Humans have been navigating based on fixed landmarks and that is both the basis and the difference with this system. Since GPS is a successful endeavor and the proposed system has similar goals, GPS will be used to compare the potential of this system.

Justification of Landmark Relative Positioning System

As previously mentioned GPS (Global Positioning System) is an already successful system so why or how could LRPS live in a seemingly already cornered niche? First of all cost is very low to users of the system. In fact, any device that a user is carrying that is Bluetooth enable will already have all the necessary hardware required. All that is needed is to acquire the driving software. Landmark information could then be uploaded and/or downloaded by users and service providers around the world.

GPS is a system, which is based on a 3 dimensional geographic region with a fourth variable—time, included. In a lot of cases for the general public a 2 dimensional depiction of their location is more than sufficient. For example, in a large city, should one turn right or left?

One detail that has been left out until now is the accuracy of this system. Most communication mediums have boundaries to there range. For example, Bluetooth devices can communicate with in a range of 10 meters to 100 meters, completely dependent on the particular device. For example if the device the user was using is a Bluetooth device that is built to communicate with other devices only up to 10 meters away then the service is at worst 10 meters accurate. Comparing this range to GPS, as noted by Peter H. Dana in a GPS overview located at http://www.colorado.edu/geography/gcraft/notes/gps/gps_f.html With the combination of Selective Availability (where Selective Availability is a mechanism used by the US government to intentionally degrade the system) and possible "blunders" gives GPS an accuracy in the range of approximately 100 meters without error and up to hundreds of kilometers (i.e. thousands of meters) at worst, with errors.

The architecture requires a network of meters, each with their own unique identification, either based on the Bluetooth MAC (median access control, or on some other specific ID). Upon installation of each meter (or possibly any other unique device—see below) then has its unique identification recorded along with 2 variables, a longitude and latitude value, which enables a precise mapping of any meter and/or any device to a 2 dimensional co-ordinate system.

Any landmark that can be detected and guaranteed to be unique is sufficient for this system. For example, if one sees the statue of liberty one can deduce with fair certainty, baring any large intervention or means, that they are on the east coast of the continent of north America, somewhere relatively near the 49th parallel. Although a relatively weak example, the idea is expandable. Imagine walking through a city and passing an ATM machine that has a unique address—be it a MAC (medium access control) address or even being Bluetooth enabled (this implies that it is equipped with a Bluetooth device and hence unique to any other ATM)—one can tell were in the city they are simply because the ATM is "visible" to the user of the service.

Sample Application Framework

The Application software was written in C++ using the Qt framework for the graphical user interface as well as a backbone for application specific objects. Some notes on this object model/framework:

Is multi threaded to accomplish the desired tasks on the iPAQ.

Incorporate efficient searching algorithms for per meter specific information maintained on the iPAQ.

The required information for plotting meters relative to the remote master device can be stored in less than one byte.

This data structure will have to be loaded at one time. Either at the beginning of the day or once for a Personal Digital Assistant assigned route. Details will need to be sorted out on the implementation. For example how much of the structure should be cached in main memory? This information will be accessed frequently during the active query mode described earlier.

A subsystem (supporting software) will need to be implemented to provide data transfer between central data store and the PDA. For example transferring meter network information to the iPAQ and possibly transferring daily progress from the PDA to a central data store.

Appendices

Appendix 1-describes meters status table algorithm

Appendix 2-describes the external Bluetooth connection priority thread algorithm Appendix 3-describes the internal task queue priority thread algorithm Appendix 4-Landmark Relative Positioning Systems Appendix 1

The algorithm is as follows:

---

Meter A detects a car has entered the stall, user has paid for one hour of use creates a task containing this state, and adds it to the task priority queue to be to be sent to its neighbors
Meter A opens a connection with Meter B
Meter A transfers its state information to Meter B
Meter B updates Meter's A state in its own meter table and adds the task to its task queue
Meter A sends a Meter_Sync_Done event
Meter B now transfers all states that it has waiting to be transferred to Meter A
Meter A now creates a new priority task for these new states from Meter B
The connection is now closed as neither device has any states left to relay
Meter B now attempts to contact another Meter, say Meter D and repeat the above process
Meter A now attempts to contact another Meter, say Meter C and repeat the bove process
The connection attempt may fail, but Meter C may open a connection to Meter A, the above process will repeat as well in this case.
Meter C transfers all of its new states to Meter A, and then gives Meter A a chance to do the same
These messages propagate around through all the meters with the correct Block ID until either:
  A meter is contacted with the events, but has no other meters on its device list to communicate to (that it, it is a leaf node)
  The state of Meter A meets up with itself at Meter Z, where Z is capable of communicating with Meter X and Meter Y. Since the original state came from Y, and this one came from Meter X, both devices are marked as contacted.
Once Meter Z gets to that task and realized that all meters have been contacted, it will drop the state task

---

Appendix 2

--- when connection request is received do
    attempt to get connection_lock
    if (get connection_lock attempt failed) abort locally initiated -continued

```
    connection
    if (device is either the PDA class or BLOCK class)
        accept connection
        wait until we get the connection_lock
        backup the current task onto the taskQueue
        check if this device is in our device list, if not than add it.
    else reject the connection
(now we wait for incoming data from the connection)
when data arrives
    check what type of event we have
        if the event is a PDA_Sync then send a PDA_Sync_Result
        packet
        if the event is a PDA_Sync_Result_Ack
        if status is OK
        if there are no more states to send, than send a
        PDA_Sync_Complete event
        else send the next PDA_Sync_Result packet
        if status is RESEND then resend the PDA_Synd_Result pack
            if the event is a Meter_Sync then update the state table for this
            address and create a new task if necessary.
            Send a Meter_Sync_Ack.
            if the event is a Meter_Sync_Ack than we must have been
            sending results so respond accordingly to the status of the ack. If
            we have no more states to send than a Meter_Sync_Done
            event.
            if the event is a Meter_Sync_Done if we have some states
            to send, than send them else close the connection
            when a disconnection occurs
    release our connection lock
    if we have tasks to be done than get the next task and execute it.
```

Appendix 3

```
main internal task queue function
while not done do
    if someone has a connection lock than set done and exit
    if there is no current task
        get next task
        if there is still no task than we've completed all our tasks already
        so set done and exit. (wait for new event)
    if we have a task than
        get the next device to contact
        if there are no more devices to contact we remove the task and
        drop through to the next iteration of the loop to get us a new
        task
    if opening a connection to that device is successful than send
    Meter_Sync packet to that device
    else sleep for a random amount of time and try again
    open connection
        if someone has the connection_than return failure
        make driver call to open connection
        if someone had the connection_lock than return failure
        else return connection
```

Appendix 4

```
The high level protocol would be implemented as such:
    If a device will have uniqueness to it, will have some sort of
    interface to it and will reside in a fixed location, it could be
    registered in a landmark database.
    A user would upload the database for a desired region to a device
    capable of interfacing with landmarks and displaying coordinate
    locations - be it visible, vocal etc.
A usage protocol for the landmark relative position system, for a
users device would be implemented as following:
    Look for Bluetooth devices
    If one is found, search your local copy of the landmark database
    for the location of that device.
    If that device is registered to a Landmark database then return to the
    user where he or she is.
```

What is claimed is:

1. An apparatus for use in controlling parking comprising:

a plurality of parking meter elements each for mounting on a support adjacent a parking location, each parking meter element including:

a payment receptacle operable by a person parking a vehicle for receiving a payment from the person;

a display for displaying an allowable time of parking;

a sensor for detecting the presence of a vehicle in the associated parking location;

a control module responsive to the payment receptacle and the sensor and arranged to control the display;

at least one transportable communication unit for transportation by and manual operation by an attendant including a control module for communicating with the parking meter elements;

the control module of each of the parking meter elements and the control module of the communication unit including communications protocols by which each of the parking meter elements and the communications unit communicate to each other via a wireless medium;

some of the parking meter elements being identified together in a group thereof such that the group and the transportable communication unit form a network;

wherein the control module of each of the parking meter elements of the group have the communication protocol thereof arranged such that each parking meter element of the group is able to communicate over a wireless medium with each other parking meter element of the group and with the transportable communication unit.

2. An apparatus for use in controlling parking comprising:

a plurality of parking meter elements each for mounting on a support adjacent a parking location, each parking meter element including;

a payment receptacle operable by a person parking a vehicle for receiving a payment from the person;

a display for displaying an allowable time of parking;

a sensor for detecting the presence of a vehicle in the associated parking location;

a control module responsive to the payment receptacle and the sensor and arranged to control the display;

at least one transportable communication unit for transportation by and manual operation by an attendant including a control module for communicating with the parking meter elements;

the control module of each of the parking meter elements and the control module of the communication unit including a communications protocol by which each of the parking meter elements and the communications unit communicate to each other via a wireless medium;

some of the parking meter elements being identified together in a group thereof such that the group and the transportable communication unit form a network;

wherein the control module of each of the parking meter elements of the group have the communication protocol thereof arranged such that each parking meter element of the group is able to communicate over a wireless medium with each other parking meter element of the group and with the transportable communication unit;

wherein the group covers a greater geographical area than a range of communication of the wireless medium and wherein each parking meter element has the control module thereof arranged to communicate with next adjacent ones of the other parking meter elements of the group and arranged such that each parking meter element generates a table containing the statue of all of the parking meter elements of the group whereby each parking meter element can communicate to the transportable communication unit the status of all.

3. The apparatus according to claim 2 wherein the control module of the transportable communication unit is arranged to act as a master for the communication protocol such that the master will initiate contact with the parking meters and the parking meter elements act as masters and slaves between one another.

4. The apparatus according to claim 2 wherein each parking meter element contains a table of entries, where each entry is the status of a parking meter element on its block.

5. The apparatus according to claim 2 wherein each parking meter element has its own group id so parking meter elements in another group will not communicate to other parking meter elements not in their group.

6. The apparatus according to claim 4 wherein the size of the status table is a dynamically created table such that, as more parking parking meter elements are discovered or removed in the group with the same group id, the status table of each parking meter element is passed to each other parking meter element, and the status table may increase and decrease in size.

7. The apparatus according to claim 2 wherein the control modules of the parking meter elements and the transportable communication unit are arranged such that a messaging system deployed within the parking meter elements is designed to be event driven, such that, once the state of a given parking meter element changes it will notify its neighbors of this change and the neighbors will then propagate this change in state to their neighbors; and the message will be dropped once there are no more parking meter elements to be contacted by a given parking meter element.

8. The apparatus according to claim 1 wherein the control modules of the parking meter elements are arranged such that, in order to implement a predetermined maximum time of parking, this amount to time uses a 8 bit representation or one byte, where the first bit is one of two states, 0 meaning no object occupying the parking space, or 1, moaning that an object occupying the parking space and the next 7 bits represent 127 minutes.

9. The apparatus according to claim 2 wherein the control modules of the parking meter elements and of the transportable communication unit are arranged such that a priority thread is used for incoming connection events in which there are two types of incoming priority connection events, the connection event of parking meter elements is lower than that of the transportable communication unit, so that when the transportable communication unit makes a connection to any parking meter element, that connection would become the highest priority event.

10. The apparatus according to claim 9 wherein the control modules of the parking meter elements and of the transportable communication unit are arranged such that the internal task queue priority thread handles multiple race condition situations since communication is not an atomic function and since other ones of the parking meter elements and the transportable communication unit could establish connections with the parking meter element to handle this type of condition there is provided a lock abstraction where the job of the task priority threads is to open a connection to the next parking meter element in the current tasks list.

11. The apparatus according to claim 10 wherein the control modules of the parking meter elements and of the transportable communication unit are arranged such that the internal task queue never actually hangs onto a connection lock, the connection lock is only held by the External Connection Priority Thread so the all other internal priority threads know the hardware is busy.

12. The apparatus according to claim 11 wherein the control modules of the parking meter elements and of the transportable communication unit are arranged such that them are two separate applications employing a priority-based system, as well as a thread-based application where the priority-based application has put the task queue priority thread as the highest priority and the connection priority thread as the lowest priority and the thread-based application does not require a priority based system because each individual specialized event will be handled by a separate thread.

13. An apparatus for use in controlling parking comprising:

a plurality of parking meter elements each for mounting on a support adjacent a parking location, each parking meter element including:
a payment receptacle operable by a person parking a vehicle for receiving a payment from the person;
a display for displaying an allowable time of parking;
a sensor for detecting the presence of a vehicle in the associated parking location;
a control module responsive to the payment receptacle and the sensor and arranged to control the display;

at least one transportable communication unit for transportation by and manual operation by an attendant including a control module for communicating with the parking meter elements;

the control module of each of the parking meter elements and the control module of the communication unit including communications protocols by which each of the parking meter elements and the communications unit communicate to each other via a wireless medium;

some of the parking meter elements being identified together in a group thereof such that the group and the transportable communication unit form a network;

wherein the control module of each of the parking meter elements of the group have the communication protocol thereof arranged such that each parking meter element of the group is able to communicate over a wireless medium with each other parking meter element of the group and with the transportable communication unit;

wherein the control modules of the parking meter elements and of the transportable communication unit are arranged such that the communication protocol uses event driven communication so that the parking meter elements of the group and the transportable communication unit are only attempting to open connections at appropriate times in order to reduce or eliminate paging collisions where the network is in a constant listening state, and a single master controls the entire network so that the master has a list of every parking meter element in the group and it has information about which parking meter elements can be contacted by other parking meter elements to make a connected loop back to itself and where, if the meters are not configured in a loop, then it is able to detect and correct that.

14. The apparatus according to claim 13 wherein, the control modules of the parking meter elements are arranged such that in the group all parking meter elements are in a listening state, the master of the group has a routing information list and passes this ordered list to the next address along with the states of all the parking meter elements and the meter parking meter element then looks up the address of the parking meter element after its own entry in the list and passes the list on to it adding its new state to the list and, also to increase the accuracy of the states held in the parking meter elements, the master sends out multiple synchronize tokens.

15. The apparatus according to claim 14 wherein the control modules of the parking meter elements are arranged such that the communication protocol uses Hops in the message token so that, once a parking meter element has received the message token, it goes through the list and increments the hop counts of the other parking meter elements in the list, and adds/updates its own state supplying a hop count of 0 using an arbitrary number for the time per hop, so when the transportable communication unit receives a synchronize event it adjusts the times remaining on the parking meter elements by the arbitrary number.

* * * * *